United States Patent
Li et al.

(10) Patent No.: US 11,659,325 B2
(45) Date of Patent: May 23, 2023

(54) METHOD AND SYSTEM FOR PERFORMING VOICE PROCESSING

(71) Applicant: BEIJING BAIDU NETCOM SCIENCE TECHNOLOGY CO., LTD., Beijing (CN)

(72) Inventors: Jingran Li, Beijing (CN); Liufeng Wang, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/560,418

(22) Filed: Dec. 23, 2021

(65) Prior Publication Data

US 2022/0272442 A1    Aug. 25, 2022

(30) Foreign Application Priority Data

Feb. 19, 2021 (CN) .......................... 202110195343.8

(51) Int. Cl.
*H04R 1/40* (2006.01)
*H04R 5/04* (2006.01)

(52) U.S. Cl.
CPC .............. *H04R 1/406* (2013.01); *H04R 5/04* (2013.01); *H04R 2430/20* (2013.01)

(58) Field of Classification Search
None
See application file for complete search history.

(56) References Cited

U.S. PATENT DOCUMENTS

| 2014/0050326 | A1 | 2/2014 | Vesa et al. |
| 2014/0324421 | A1* | 10/2014 | Kim ................. H04N 21/43637 704/233 |
| 2015/0049892 | A1* | 2/2015 | Petersen .............. H04R 25/554 381/315 |
| 2015/0110263 | A1 | 4/2015 | Johnston et al. |
| 2018/0254038 | A1 | 9/2018 | Kawano et al. |

FOREIGN PATENT DOCUMENTS

| CN | 105653233 A | 6/2016 |
| CN | 105718236 A | 6/2016 |
| CN | 107680593 A | 2/2018 |
| CN | 108369492 A | 8/2018 |
| CN | 109286875 A | 1/2019 |
| CN | 109462794 A | 3/2019 |

(Continued)

OTHER PUBLICATIONS

"How to use the Roku remote and all its features." Cord Cutters News, Oct. 22, 2020, www.cordcuttersnews.com/how-to-use-roku-remote/. (Year: 2020).*

(Continued)

*Primary Examiner* — James K Mooney
(74) *Attorney, Agent, or Firm* — Brooks Kushman P.C.

(57) ABSTRACT

A voice processing method, an electronic device and a readable storage medium, which relate to the field of voice processing technologies, are disclosed. The method includes: collecting a first audio signal; processing the first audio signal using a preset algorithm to obtain a second audio signal; and sending the second audio signal to a first device, such that the first device performs a voice processing operation on the second audio signal.

12 Claims, 4 Drawing Sheets

(56) References Cited

FOREIGN PATENT DOCUMENTS

| | | |
|---|---|---|
| CN | 109817206 A | 5/2019 |
| CN | 111724805 A | 9/2020 |
| CN | 111986669 A | 11/2020 |
| CN | 112349282 A | 2/2021 |
| JP | 2007336232 A | 12/2007 |
| JP | 2020112692 A | 7/2020 |

OTHER PUBLICATIONS

Extended European Search Report of European application No. 21215645.9 dated Jun. 13, 2022, 7 pages.

* cited by examiner

METHOD AND SYSTEM FOR PERFORMING VOICE PROCESSING

CROSS-REFERENCE TO RELATED APPLICATIONS

The present disclosure claims the priority and benefit of Chinese Patent Application No. 202110195343.8, filed on Feb. 19, 2021, entitled "VOICE PROCESSING METHOD AND APPARATUS ELECTRONIC DEVICE AND READABLE STORAGE MEDIUM." The disclosure of the above application is incorporated herein by reference in its entirety.

TECHNICAL FIELD

The present disclosure relates to the field of data processing technologies, and particularly to the field of voice processing technologies. A voice processing method, an electronic device and a readable storage medium are proposed.

BACKGROUND

In current terminal devices, such as smart phones, tablet computers, or the like, audio signals are collected by built-in microphones thereof. However, the microphone of the terminal device has a limited sound pickup distance and is prone to interference by other noises.

SUMMARY

According to an embodiment of the present disclosure, there is provided a voice processing method, including: collecting a first audio signal; processing the first audio signal using a preset algorithm to obtain a second audio signal; and sending the second audio signal to a first device, such that the first device performs a voice processing operation on the second audio signal.

According to an embodiment of the present disclosure, there is provided an electronic device, including: at least one processor; and a memory connected with the at least one processor communicatively, wherein the memory stores instructions executable by the at least one processor to enable the at least one processor to perform the method as mentioned above.

According to an embodiment of the present disclosure, there is provided a non-transitory computer readable storage medium with computer instructions stored thereon, wherein the computer instructions are used for causing a computer to perform the method as mentioned above.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and mechanisms are omitted in the descriptions below.

The present disclosure provides a voice processing method, an electronic device and a readable storage medium, which aim to simplify voice processing steps of a terminal device and improve a voice processing efficiency of the terminal device.

Figure 1:
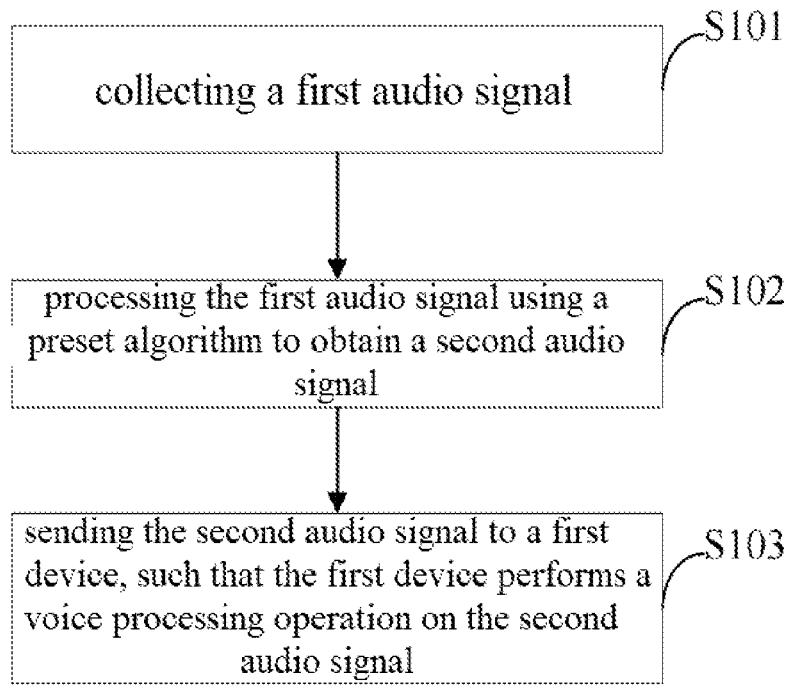
FIG. 1 is a schematic diagram according to a first embodiment of the present disclosure.

FIG. 1 is a schematic diagram according to a first embodiment of the present disclosure. As shown in FIG. 1, a voice processing method according to this embodiment may be performed in a voice processing device, and may specifically include the following steps:

S101: collecting a first audio signal;

S102: processing the first audio signal using a preset algorithm to obtain a second audio signal; and S103: sending the second audio signal to a first device, such that the first device performs a voice processing operation on the second audio signal.

A voice processing device connected with the first device serves as a subject for executing the voice processing method according to this embodiment; after obtaining the second audio signal according to the collected first audio signal, the voice processing device sends the second audio signal to the first device connected therewith, such that the first device performs the voice processing operation on the received second audio signal, and therefore, a voice may be processed without collecting the audio signal by the first device, thereby simplifying voice processing steps of the first device and improving a voice processing efficiency of the first device.

In this embodiment, the first device may be an intelligent device, such as a smart phone, a personal computer, an intelligent sound box, an intelligent household appliance, a vehicle-mounted device, or the like; that is, in this embodiment, the voice is processed by the intelligent device and the voice processing device externally connected with the intelligent device.

In this embodiment, before performing S101 of collecting the first audio signal, the voice processing device further establishes a communication connection with the first device. For example, the established communication connection is a wired connection; for example, the voice processing device is connected with the first device through a 4-section audio cable of 3.5 mm. For another example, the established communication connection is a wireless connection; for example, the voice processing device is connected with the first device via Bluetooth or WiFi.

In this embodiment, the voice processing device may be turned on or turned off by a switch of its own, such that before or after the voice processing device is in the on state, the wired connection or the wireless connection with the first device is established, and the first audio signal is collected.

In this embodiment, the voice processing device may start to collect an audio signal around the device as the first audio signal immediately after establishing the communication connection with the first device. Since the voice processing device is externally connected with the first device, the voice processing device may be placed at a position remote from the first device, thereby realizing far-field audio collection of the first device.

In addition, in this embodiment, when the voice processing device executes S101 of collecting the first audio signal, an optional implementation may include: after receiving a recording instruction sent by the first device, starting to collect the first audio signal, the recording instruction being sent to the voice processing device by the first device when the first device detects that the first device opens a preset application.

It may be understood that the preset application opened by the first device in this embodiment may be one of a recording application, a translation application, a voice recognition application, or the like, such that the first device performs different voice processing operations, such as recording, translation, recognition, or the like, on the audio signal collected by the voice processing device.

Therefore, in this embodiment, the voice processing device may start to collect the audio signal in a specific scenario, thus avoiding resource waste caused by wrong collection when the first device does not need audio signal acquisition, and improving audio signal collection accuracy of the voice processing device.

In this embodiment, after performing S101 of collecting the first audio signal, the voice processing device performs S102 of processing the collected first audio signal using the preset algorithm, so as to obtain the processed second audio signal.

In this embodiment, the preset algorithm used when the voice processing device performs S102 includes, but is not limited to, at least one of an echo cancellation algorithm, a beam forming algorithm, a sound source localization algorithm, a fixed beam gain method algorithm, a fixed beam noise suppression algorithm, a dereverberation algorithm, or the like.

That is, in this embodiment, after collecting the first audio signal, the voice processing device further processes the first audio signal using a series of signal processing algorithms, so as to obtain the second audio signal with a high signal-to-noise ratio and a high definition, thereby avoiding a step in which the first device itself is required to process the received audio signal, and improving the voice processing efficiency of the first device.

In addition, in this embodiment, after performing S102 to obtain the second audio signal, the voice processing device may further perform digital-to-analog conversion on the obtained second audio signal, so as to convert a format of the second audio signal from a digital signal to an analog signal, and send the converted signal to the first device.

In this embodiment, after performing S102 to obtain the second audio signal, the voice processing device performs S103 of sending the obtained second audio signal to the first device, such that the first device performs the corresponding voice processing operation according to the received second audio signal.

The voice processing operation performed by the first device according to the second audio signal in this embodiment may be a voice processing operation of a fixed type, such as one of recording, translation, and recognition.

In addition, the voice processing operation performed by the first device according to the second audio signal in this embodiment may also correspond to the application opened by the first device. If the first device opens a recording application, the first device stores the received second audio signal; if the first device opens a translation application, the first device translates the received second audio signal to obtain a translation result; and if the first device opens a recognition application, the first device recognizes the received second audio signal to obtain a recognition result.

In this embodiment, the voice processing device may further perform: receiving a control instruction sent by the first device, the control instruction including an angle range for controlling the voice processing device to pick up sounds, and the control instruction being sent by a user through the first device; and adjusting a sound pickup direction according to the received control instruction, that is, adjusting a sound pickup direction of a microphone array according to the angle range included in the control instruction.

For example, the microphone array in the voice processing device may pick up sounds in all directions within 360°, and if the angle range included in the control instruction sent by the first device is 0° to 180°, the voice processing device controls the microphone array to only collect sounds located in front of the microphone array within the range of 0° to 180° in a clockwise direction.

That is, in this embodiment, the voice processing device may also adjust the sound pickup direction according to the control instruction sent by the first device, thereby realizing directional sound pickup by the voice processing device, avoiding interference by noises in other directions, and further enhancing accuracy of the collected first audio signal.

With the above-mentioned method according to this embodiment, the audio signal is collected by the voice processing device externally connected with the first device, and voice may be processed without collecting the audio signal by the first device, thereby simplifying the voice processing steps of the first device and improving the voice processing efficiency of the first device.

Figure 2:
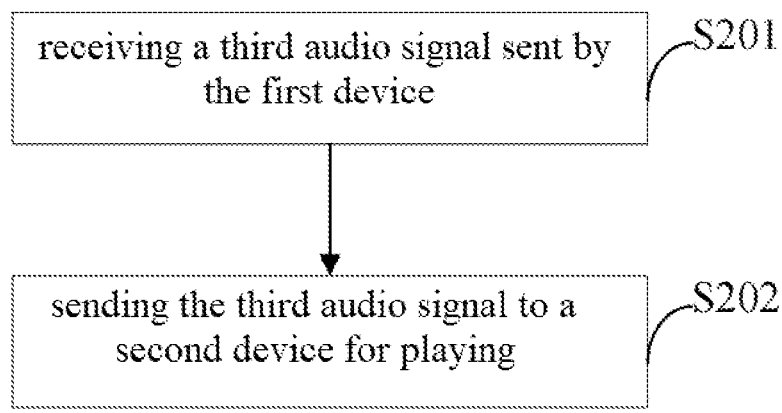
FIG. 2 is a schematic diagram according to a second embodiment of the present disclosure.

FIG. 2 is a schematic diagram according to a second embodiment of the present disclosure. As shown in FIG. 2, the voice processing method performed in the voice processing device according to this embodiment may further include the following steps:

S201: receiving a third audio signal sent by the first device; and

S202: sending the third audio signal to a second device for playing.

That is, in this embodiment, the voice processing device may also establish a communication connection with the second device on the basis of establishing the communication connection with the first device, so as to achieve a purpose of sending the audio signal sent by the first device to the second device for playing.

In this embodiment, the second device may be configured as a terminal device, such as an intelligent sound box, an intelligent household appliance, or the like; before executing S202 of sending the third audio signal to the second device, the voice processing device further performs a step of establishing the communication connection with the second device, the established communication connection may be a wired connection or a wireless connection, and a communication connection mode is not limited in the present disclosure.

In this embodiment, after executing S201 of receiving the third audio signal sent by the first device, the voice processing device may further perform an echo cancellation on the collected audio signal according to the third audio signal, so as to improve the accuracy of the audio signal collected by the voice processing device.

In addition, in this embodiment, before executing S202 of sending the third audio signal to the second device, the voice processing device may also convert the third audio signal, that is, convert a format of the third audio signal from an analog signal to a digital signal, and send the converted audio signal to the second device.

Figure 3:
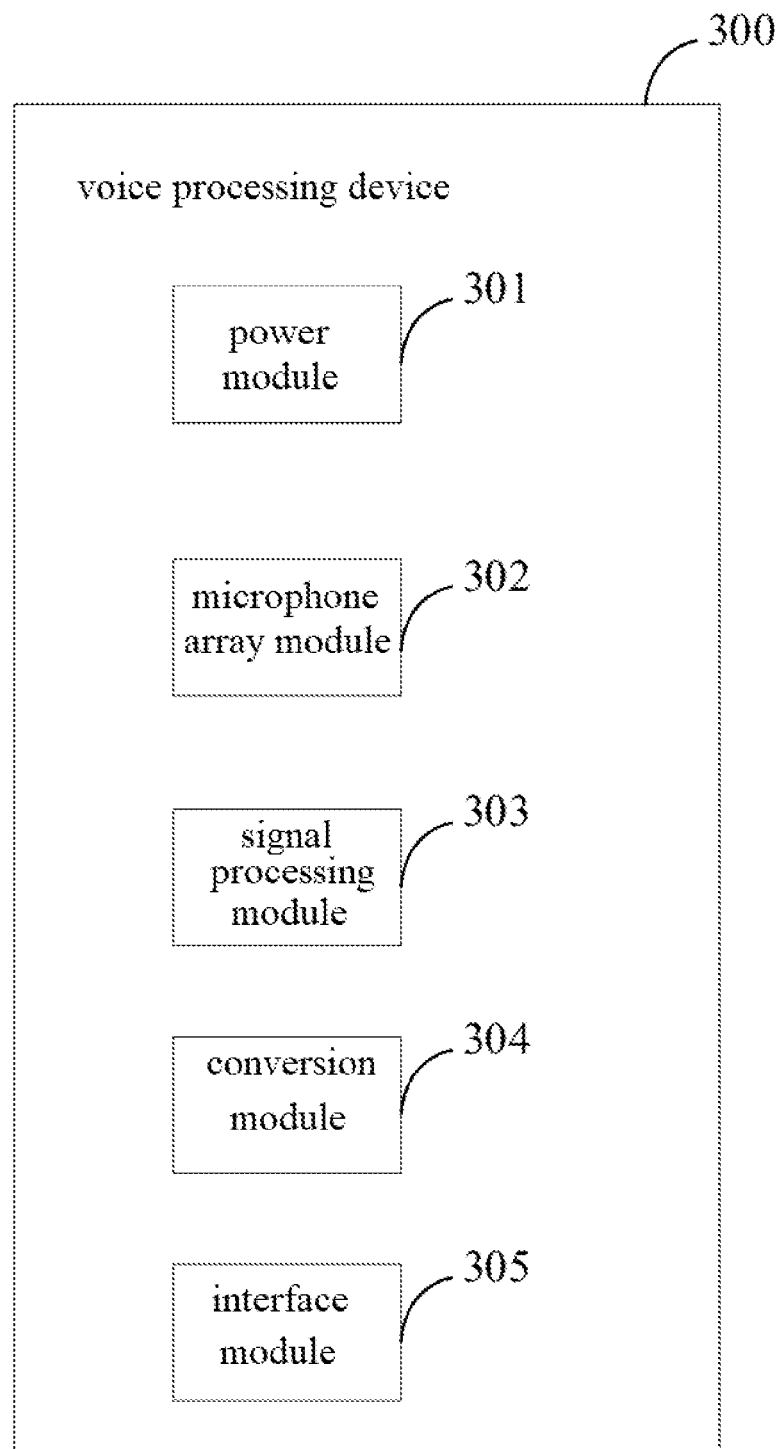
FIG. 3 is a schematic diagram according to a third embodiment of the present disclosure.

FIG. 3 is a schematic diagram according to a third embodiment of the present disclosure. FIG. 3 shows an architecture diagram of a voice processing device 300 in this embodiment, and as shown in FIG. 3, the voice processing device 300 in this embodiment includes a power module 301, a microphone array module 302, a signal processing module 303, a conversion module 304, and an interface module 305.

The power module 301 includes a charger, a rechargeable lithium battery and a voltage conversion chip, and a user may turn on or off the voice processing device by a switch of the power module; the microphone array module 302 includes a plurality of digital/analog microphones which may collect an audio signal in all directions within 360°; the signal processing module 303 includes a signal processor and a flash memory, the flash memory stores a preset algorithm, and the signal processor processes the collected audio signal according to the stored preset algorithm; the conversion module 304 includes a digital-to-analog converter and an analog-to-digital converter, the digital-to-analog converter is configured to convert the audio signal into an analog signal, and the analog-to-digital converter is configured to convert the audio signal into a digital signal; the interface module 305 includes a charging interface, a recording interface and a playing interface, the recording interface is connected with the first device, and the playing interface is connected with the second device.

Figure 4:
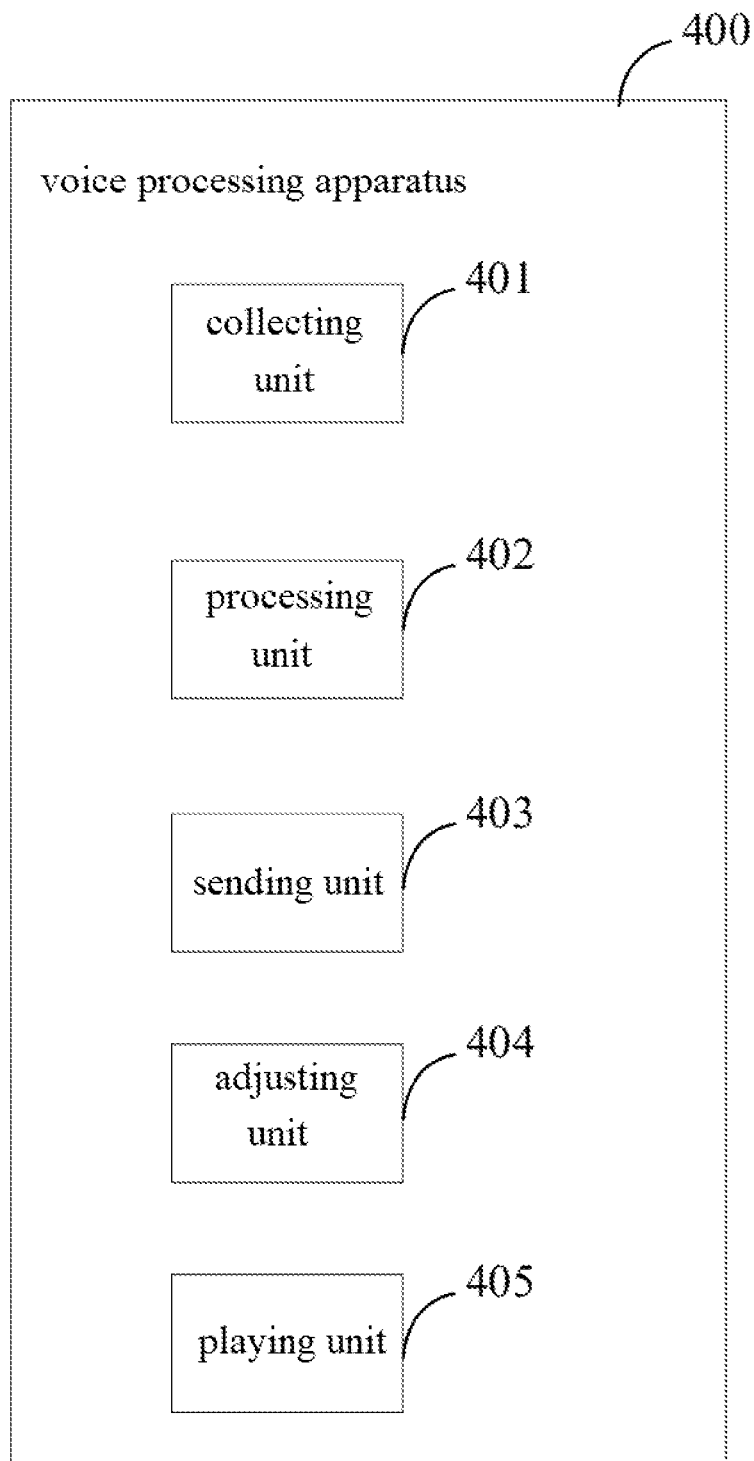
FIG. 4 is a schematic diagram according to a fourth embodiment of the present disclosure.

FIG. 4 is a schematic diagram according to a fourth embodiment of the present disclosure. As shown in FIG. 4, a voice processing apparatus 400 located in a voice processing device according to this embodiment includes a collecting unit 401 configured for collecting a first audio signal; a processing unit 402 configured for processing the first audio signal using a preset algorithm to obtain a second audio signal; and a sending unit 403 configured for sending the second audio signal to a first device, such that the first device performs a voice processing operation on the second audio signal.

In this embodiment, before collecting the first audio signal, the collecting unit 401 is further configured to establish a communication connection with the first device, and the established communication connection may be a wired connection or a wireless connection.

In this embodiment, the collecting unit 401 may start to collect an audio signal around the device as the first audio signal immediately after establishing the communication connection with the first device. Since the voice processing device is externally connected with the first device, the voice processing device may be placed at a position remote/apart from the first device, thereby realizing far-field audio collection of the first device.

In addition, in this embodiment, when the collecting unit 401 collects the first audio signal, an optional implementation may include: after receiving a recording instruction sent by the first device, starting to collect the first audio signal, the recording instruction being sent to the voice processing device by the first device when the first device detects that the first device opens a preset application.

Therefore, in this embodiment, the collecting unit 401 may start to collect the audio signal in a specific scenario, thus avoiding resource waste caused by wrong collection when the first device does not need audio signal acquisition, and improving audio signal collection accuracy of the voice processing device.

In this embodiment, after collecting the first audio signal by the collecting unit 401, the voice processing device processes the collected first audio signal by the processing unit 402 using the preset algorithm, so as to obtain the processed second audio signal.

In this embodiment, the preset algorithm used by the processing unit 402 includes, but is not limited to, at least one of an echo cancellation algorithm, a beam forming algorithm, a sound source localization algorithm, a fixed beam gain method algorithm, a fixed beam noise suppression algorithm, a dereverberation algorithm, or the like.

That is, in this embodiment, after collecting the first audio signal, the voice processing device further processes the first audio signal by the processing unit 402 using a series of signal processing algorithms, so as to obtain the second audio signal with a high signal-to-noise ratio and a high definition, thereby avoiding a step in which the first device is required to process the received audio signal, and improving the voice processing efficiency of the first device.

In addition, in this embodiment, after obtaining the second audio signal, the processing unit 402 may further perform digital-to-analog conversion on the obtained second audio signal, so as to convert a format of the second audio signal from a digital signal to an analog signal, and send the converted signal to the first device.

In this embodiment, after obtaining the second audio signal by the processing unit 402, the voice processing device sends the obtained second audio signal to the first device by the sending unit 403, such that the first device performs the corresponding voice processing operation according to the received second audio signal.

The voice processing apparatus 400 located in the voice processing device according to this embodiment may further include an adjusting unit 404 configured to perform: receiving a control instruction sent by the first device, the control instruction including an angle range for controlling the voice processing device to pick up sounds, and the control instruction being sent by a user through the first device; and adjusting a sound pickup direction according to the received control instruction, that is, adjusting a sound pickup direction of a microphone array according to the angle range included in the control instruction.

That is, in this embodiment, the voice processing device may also adjust the sound pickup direction by the adjusting unit 404 according to the control instruction sent by the first device, thereby realizing directional sound pickup by the voice processing device, avoiding interference by noises in other directions, and further enhancing accuracy of the collected first audio signal.

The voice processing apparatus 400 located in the voice processing device according to this embodiment may further include a playing unit 405 configured to perform: receiving a third audio signal sent by the first device; and sending the third audio signal to a second device for playing.

That is, in this embodiment, the voice processing device may also establish a communication connection with the second device by the playing unit 405 on the basis of establishing the communication connection with the first device, so as to achieve a purpose of sending the audio signal sent by the first device to the second device for playing.

In this embodiment, after receiving the third audio signal sent by the first device, the playing unit 405 may further perform an echo cancellation on the collected audio signal according to the third audio signal, so as to improve the accuracy of the audio signal collected by the voice processing device.

In addition, in this embodiment, before sending the third audio signal to the second device, the playing unit 405 may also convert the third audio signal, that is, convert a format of the third audio signal from an analog signal to a digital signal, and send the converted audio signal to the second device.

According to the embodiment of the present disclosure, there are also provided an electronic device, a readable storage medium and a computer program product.

Figure 5:
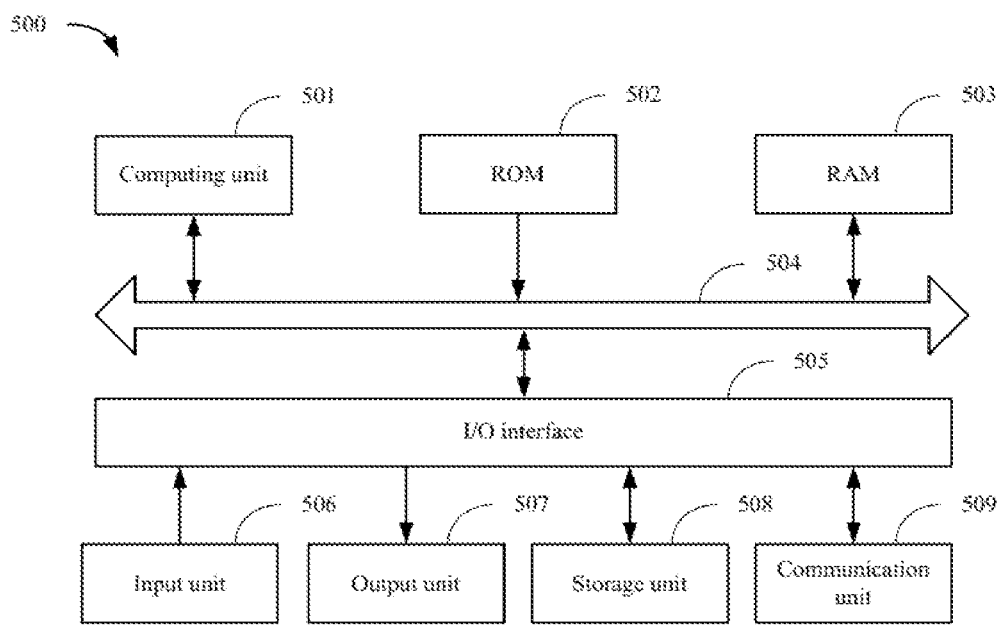
FIG. 5 is a block diagram of an electronic device configured to implement the methods for processing voices according to the embodiments of the present disclosure.

FIG. 5 is a block diagram of an electronic device for the voice processing method according to the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile devices, such as personal digital assistants, cellular telephones, smart phones, wearable devices, and other similar computing devices. The components shown herein, their connections and relationships, and their functions, are meant to be exemplary only, and are not meant to limit implementation of the present disclosure described and/or claimed herein.

As shown in FIG. 5, the device 500 includes a computing unit 501 which may perform various appropriate actions and processing operations according to a computer program stored in a read only memory (ROM) 502 or a computer program loaded from a storage unit 508 into a random access memory (RAM) 503. Various programs and data necessary for the operation of the device 500 may be also stored in the RAM 503. The computing unit 501, the ROM 502, and the RAM 503 are connected with one other through a bus 504. An input/output (I/O) interface 505 is also connected to the bus 504.

The plural components in the device 500 are connected to the I/O interface 505, and include: an input unit 506, such as a keyboard, a mouse, or the like; an output unit 507, such as various types of displays, speakers, or the like; the storage unit 508, such as a magnetic disk, an optical disk, or the like; and a communication unit 509, such as a network card, a modem, a wireless communication transceiver, or the like. The communication unit 509 allows the device 500 to exchange information/data with other devices through a computer network, such as the Internet, and/or various telecommunication networks.

The computing unit 501 may be a variety of general and/or special purpose processing components with processing and computing capabilities. Some examples of the computing unit 501 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 501 performs the methods and processing operations described above, such as the voice processing method. For example, in some embodiments, the voice processing method may be implemented as a computer software program tangibly contained in a machine readable medium, such as the storage unit 508.

In some embodiments, part or all of the computer program may be loaded and/or installed into the device 500 via the ROM 502 and/or the communication unit 509. When the computer program is loaded into the RAM 503 and executed by the computing unit 501, one or more steps of the voice processing method described above may be performed. Alternatively, in other embodiments, the computing unit 501 may be configured to perform the voice processing method by any other suitable means (for example, by means of firmware).

Various implementations of the systems and technologies described herein may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input device, and at least one output device.

Program codes for implementing the method according to the present disclosure may be written in any combination of one or more programming languages. These program codes may be provided to a processor or a controller of a general purpose computer, a special purpose computer, or other programmable data processing devices, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display device (for example, a cathode ray tube (CRT) or liquid crystal display (LCD) monitor) for displaying information to a user; and a keyboard and a pointing device (for example, a mouse or a trackball) by which a user may provide input for the computer. Other kinds of devices may also be used to provide interaction with a user; for example, feedback provided for a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A voice processing method, comprising:
sending a recording instruction by a first device when the first device detects that the first device opens a preset application;
collecting, by a voice processing device, a first audio signal in response to receiving the recording instruction;
processing, by the voice processing device, the first audio signal using a preset algorithm to obtain a second audio signal;
sending, by the voice processing device, the second audio signal to the first device; and
performing, by the first device, a voice processing operation on the second audio signal,
wherein the preset application comprises a recording application, a translation application, or a recognition application, and the voice processing operation comprises correspondingly a recording operation, a translation operation or a recognition operation.

2. The method according to claim 1, further comprising:
receiving, by the voice processing device, a control instruction sent by the first device, the control instruction including an angle range for picking up a sound; and
adjusting, by the voice processing device, a sound pickup direction according to the angle range included in the control instruction.

3. The method according to claim 1, further comprising:
receiving, by the voice processing device, a third audio signal sent by the first device; and
sending, by the voice processing device, the third audio signal to a second device for playing.

4. The method according to claim 1, wherein the voice processing device is externally connected with the first device.

5. The method according to claim 4, wherein the voice processing device is connected with the first device through a 4-section audio cable of 3.5 mm.

6. The method according to claim 1, wherein the voice processing device is remote from the first device.

7. A voice processing system, comprising:
a voice processing device configured for collecting a first audio signal in response to receiving a recording instruction;
processing the first audio signal using a preset algorithm to obtain a second audio signal; and
sending the second audio signal; and
a first device configured for sending the recording instruction to the voice processing device when the first device detects that the first device opens a preset application; receiving the second audio signal from the voice processing device, and performing a voice processing operation on the second audio signal,
wherein the preset application comprises a recording application, a translation application, or a recognition application, and the voice processing operation comprises correspondingly a recording operation, a translation operation or a recognition operation.

8. The voice processing system according to claim 7, wherein the voice processing device is further configured for:
receiving a control instruction sent by the first device, the control instruction including an angle range for picking up a sound; and
adjusting a sound pickup direction according to the angle range included in the control instruction.

9. The voice processing system according to claim 7, wherein the voice processing device further configured for:
receiving a third audio signal sent by the first device; and
sending the third audio signal to a second device for playing.

10. The voice processing system according to claim 7, wherein the voice processing device is externally connected with the first device.

11. The voice processing system according to claim 10, wherein the voice processing device is connected with the first device through a 4-section audio cable of 3.5 mm.

12. The voice processing according to claim 7, wherein the voice processing device is remote from the first device.

* * * * *